United States Patent [19]
Denton

[11] 3,820,744
[45] June 28, 1974

[54] LIGHTER-THAN-AIR AIRCRAFT

[76] Inventor: Harvey R. Denton, 339 Broadway, Alameda, Calif. 94501

[22] Filed: Mar. 12, 1973

[21] Appl. No.: 340,359

[52] U.S. Cl. .................................. 244/5, 244/30
[51] Int. Cl. ............................................. B64b 1/04
[58] Field of Search .................. 244/5, 24–30, 244/125–127

[56] References Cited
UNITED STATES PATENTS
1,451,503  4/1923  Goetz ................................. 244/29
1,684,163  9/1928  Valentin ............................. 244/26

*Primary Examiner*—Duane A. Reger
*Assistant Examiner*—Jesus D. Sotelo
*Attorney, Agent, or Firm*—Townsend and Townsend

[57] ABSTRACT

A lighter-than-air aircraft of circular design having a vertically extending, central, hollow core of rigid material coaxially disposed within a horizontally disposed, annularly extending, rigid outer frame spaced outwardly of said core and positioned in a plane that is perpendicular to the vertical axis of said core and that intersects said core intermediate its upper and lower ends.

An upper annular row of substantially equally tensioned elongated elements, such as wire ropes, strips or elements of similar strength, extend radially outwardly from the upper and lower ends of the core to said outer frames. Said elements will hereafter be generally called "wires" in the description and claims.

The wires of said upper row extend convergently to said frame, the latter having a vertical dimension substantially less than the height of said core, and the ends of the wires of both rows are secured to said frame. An outer skin may cover said wires and extend outwardly of said frame to form an approximately circular, relatively sharp outer edge around the aircraft.

Power actuated means are provided for driving the aircraft and for directionally manipulating it, with the interior of said aircraft between the rows of wires and wherever space is adequate, being filled with compartments or bags for gas, such as helium. Ballast, in the form of a payload is carried at the lower end of the hollow core.

8 Claims, 6 Drawing Figures

PATENTED JUN 28 1974　　　　3,820,744

LIGHTER-THAN-AIR AIRCRAFT

BACKGROUND AND SUMMARY

Heretofore aircraft of the rigid-frame dirigible type has proven to be successful for carrying substantial loads, but the horizontally elongated shape of the conventional dirigibles was found to be susceptible to collapse from side strain. Normally the length of said dirigibles was approximately six times the diameter, with a length up to 800 feet and more, and current designs contemplate a length of 1,200 feet with a load carrying capacity of approximately 500 tons. However, the elongated design remains approximately the same.

One of the main objects of this invention is the provision of a lighter-than-air aircraft that has a greater load carrying capacity than that of the conventional elongated dirigible-type for the same maximum horizontal dimension, and which is readily maneuverable and with at least the same degree of speed, but in which approximately all of the structure that encloses the gas for lifting the aircraft is under a tension resisting breakage from normal and abnormal pressures, impacts and strains.

A still further object of the invention is the provision of a circular lighter-than-air aircraft having approximately the outer outline of a pair of circular relatively shallow conical discs with their circular outer rims together, and the major portion of which aircraft is held in that shape by wires under tension extending from the upper and lower ends of a vertical central hollow core to approximately the outer rims of said discs.

Other objects and advantages will appear in the description and in the drawings.

THE DRAWINGS

FIG. 1 is a semi-diagrammatic top plan view of the aircraft, partly broken away to show interior structure.

FIG. 2 is a semi-diagrammatic side-elevational view, partly broken away to show interior structure.

FIG. 3 is an enlarged, fragmentary, cross-sectional view along line 3—3 of FIG. 1.

FIG. 4 is a greatly enlarged, fragmentary, cross-sectional view taken along line 4—4 of FIG. 3.

FIG. 5 is an enlarged, fragmentary, cross-sectional view at line 5—5 of FIG. 4 showing a portion in elevation.

FIG. 6 is an enlarged, fragmentary, cross-sectional view along line 6—6 of FIG. 1.

Figure 2:
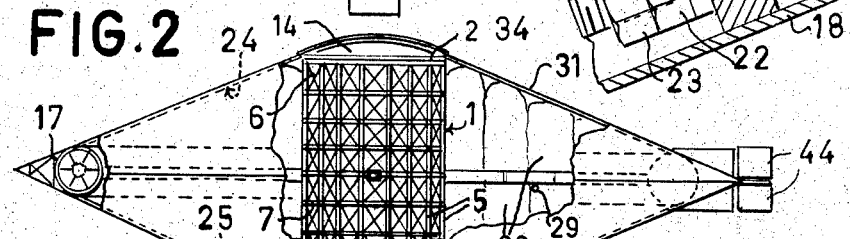

The inside diameter and height of the core will vary with the size of the aircraft, which diameter may be approximately one quarter to approximately one fifth the diameter of the aircraft, and the height may be approximately one third the diameter of the aircraft.

Where said core is of structural members, which may be of aluminum or aluminum alloy, vertical columns 5 (FIG. 2) are provided, which columns are connected by struts or trusses 6. The trusses may be cables under tension, with horizontal annular rings 7 rigid with and supporting the columns in an annular row.

At the lowermost end of the core is one or more horizontal bottom walls and side walls forming passenger and pilot accommodations 9 below ring 3 and cargo space 8 within the lower end of the core above the ring and ground wheels generally designated 8' are below said passenger compartment 9 for supporting the aircraft for movement over the ground.

The upper end of the core is closed by an upper wall 11 (FIGS. 1, 6) and the space above the cargo compartment contains a plurality of bags filled with helium. Cross members 12 extending across the inside of the core 1 provide means to which the bags may be secured, and at one side of the core, but within the latter is an elevator 13 extending from the bottom of the core to the top (FIG. 1) and opening into the space 14 above the top wall 11.

Figures 3, 4:
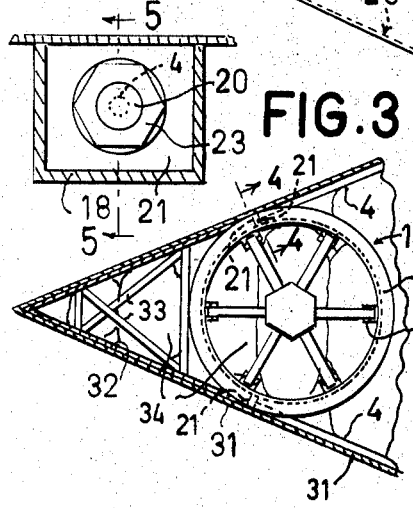

A hollow, annular outer frame 17 (FIGS. 1, 2, 3) is coaxial with the core 1 and spaced outwardly of the latter.

The horizontal plane in which frame 17 is positioned is perpendicular to the vertical axis of core 1 and may intersect the latter substantially midway between the upper and lower ends of core 1.

Frame 17 comprises an annular row of equally spaced annular frame members 18 (FIG. 3) disposed in vertical planes intersecting the vertical axis of the core 1. The rings or frame members 17 are connected by horizontally disposed rings 19 spaced around the interior of the annular row of frame members 18 and welded or rigidly secured to the inner sides of said members. These rings 1 are coaxial with the core 1.

Each of the frame members 18 may be a radially outwardly opening channel element having its web secured to and against the horizontal annular rings 19.

Figure 5:
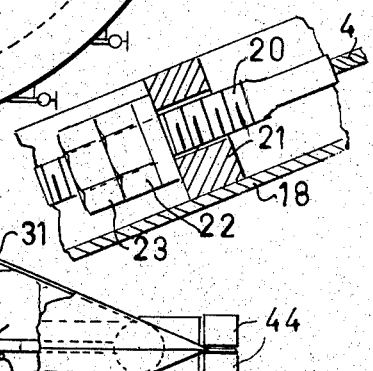
Figure 6:
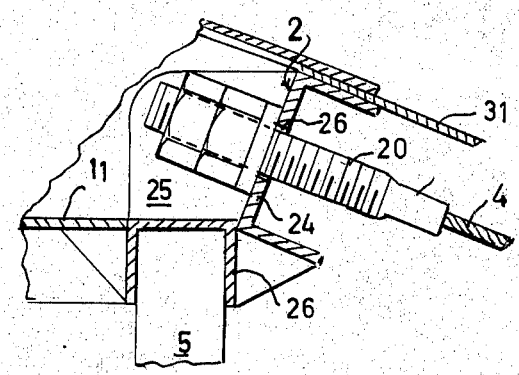

Each of the wire ropes or wires 4 is of relatively small diameter, and each may be inseparably secured at each of its outer end within an extension at one end of an exteriorly threaded tubular element 20 (FIGS. 5, 6).

Rigid within the outwardly opening channels of rings 18 in the outer annular frame 17 a cross piece 21 (FIGS. 3, 5) is rigidly secured at the upper and lower sides of the ring. This cross piece 21 is formed with an opening through which the tubular element 20 at one of the ends of the wires 4 of the upper and outer row of wires extends. FIG. 5 shows only the lower end of a wire of the upper row, but the same structure is provided for each wire of the lower row.

The upper ring 2 at the upper end of the core and the ring 3 at the lower end may each be a channel member with their flanges extending toward the circular outer frame 17 and their webs facing the upper and lower cross pieces 21. FIG. 6 shows the upper ring 2, and the lower ring has the same structure, but faces the lower cross piece 21.

The externally threaded portion of the tubular members 20 on the inner ends of the wires 4 of the upper and lower row each extends through an opening 26 in the web 25 of each ring, and the nuts 22, 23 are on the ends of said members that project past the webs.

Plates 25 welded to the webs 24 of rings 2, 3 and to the upper end of an annular channel 26' at the upper and lower ends of the row of posts 5 may rigidly secure the upper and lower rings 2, 3 to the core when tension is applied to the wires 4.

The wires 4 of the upper and lower row may be tensioned by adjusting the nuts at either of the ends of the wires, but normally the adjustment is made at the rings 2, 3 as these are usually most accessible, although access may be had to either of the ends. Obviously, if desired, the nuts may be welded to the tubular members at the outer frame 17 if desired, so they merely form a stop against the cross pieces 21.

Cross members 28 (FIG. 1), similar to spokes in a wheel, extend radially from the core 1 to the outer frame 17 and are welded at their ends to the core and frame, and one or more annular members 29 coaxial with and spaced between the core and frame 17 may be rigidly secured to the radially extending members 28. The bags of lifting gas 30 that fill the space between the core and the outer frame 17 may be attached to the members 28, 29.

An outer skin 31 such as fabric, rubber-like material or metal, is connected with the upper and lower ends of the core 1 and extends past the upper and lower sides of the frame 17 to meeting relation forming the relatively sharp outer peripheral edge of the aircraft. Said skin and its extensions extend over the upper and lower rows of wires 4 and the extensions connect along the sharp outer edge of the aircraft.

This extension 32 outwardly of the frame 17 is hollow and may include internal trusses or reinforcing elements 33, as well as bags 34 containing the lifting gas.

The upper wall 11 for core 1 is sufficiently rigid to support a helicopter or cargo deposited therein by a helicopter for lowering by the elevator to the cargo compartment or deck 10.

Skin 31 may be extended in the shape of a dome-like wall 35 to overlie the upper wall 11 and is provided with doors 36 supported on rollers for moving from closed to open positions and vice versa and is releasably locked closed by any suitable means provided for locking airplane doors.

Fuel lines extend from fuel tanks, which may be around or in the cargo space, to the motors 40 supported along and outwardly of the outer rim 32 for movement about vertical and horizontal axes controlled from the compartment at the lower end of core 1 to assist in steering the aircraft and for ascent and descent of the latter. Such motors may be of any type, such as diesel, electric or by a nuclear power plant located in the bottom center of the aircraft.

Figure 1:
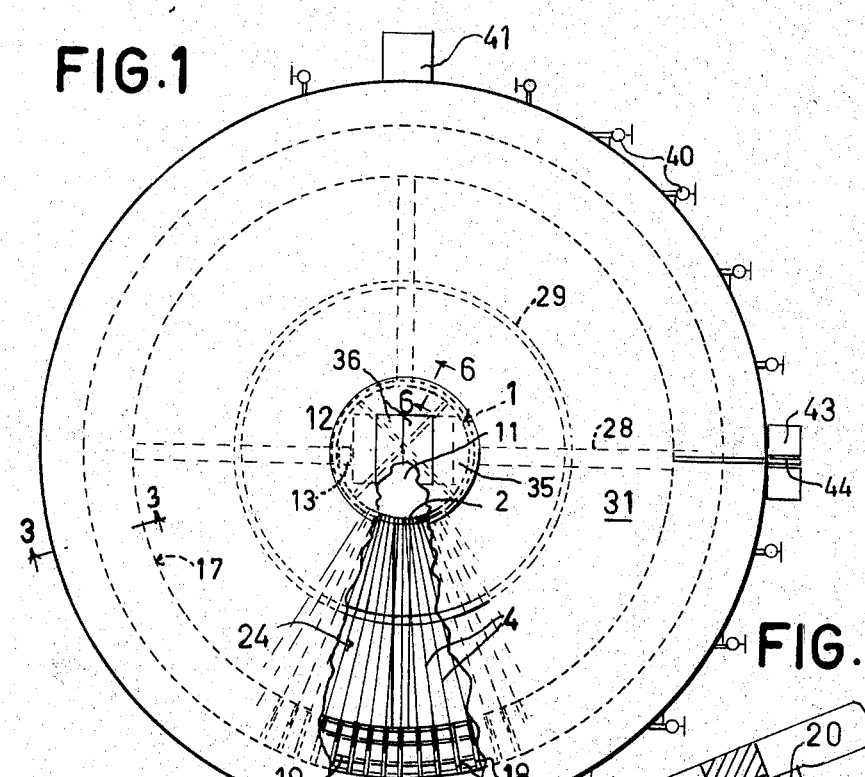
Referring to FIGS. 1, 2, the aircraft has a central, vertically disposed, rigid core generally designated 1. This core may be a skeleton structure of structural metal having an annular upper ring 2 (FIGS. 1, 2, 6) at its upper end, and a similar lower ring 3 (FIG. 2) at its lower end. Said rings are rigid with and coaxial with the core 1, and one of the ends of the wires 4 of an upper and lower annular row are connected with said upper and lower rings, and extend generally radially outwardly to an outer ring as will later be explained more in detail.

The motors indicated in FIG. 1 are positioned around the rear edge of the aircraft relative to its forward direction of travel, and control planes 41 at the opposite lateral edges, are supported for tilting movement about a horizontal extending transversely of the normal forward direction of travel of the aircraft, while horizontal planes 43 at the rear of the aircraft are similarly supported for tilting while vertically disposed planes 44 at the rear are supported for movement about a vertical axis to assist in maneuvering the aircraft during its movement.

From the foregoing it is seen that the basic outer frame structure is under tension, with the exception of the outer frame, and any force applied to the structure is distributed over the entire framework, instead of being restricted to a localized area, as in conventional structure.

The metal is preferably of the lightest that can be used consistent with the stresses to be placed thereon. The wires of course are of steel, but considering the enormous resistance to breaking of the wires under tension, the wire ropes 4 may be a relatively small fractional part of an inch in diameter, and as a group are capable of carrying a payload in excess of 3,000 tons with an adequate margin of safety in an aircraft of the dimensions herein described.

The advantages of a lighter-than-air aircraft in landing and taking off with a heavy load are obvious and while the rate of movement is less than that of a conventional airplane, it is far greater than that of seagoing vessels and is free from obstacles such as mountains, icebergs, rough seas and rough terrains and is free to maneuver to different heights and areas in the air.

I claim:

1. A lighter-than-air aircraft, comprising:
    a. a vertically disposed, hollow, inner frame, and a horizonally disposed annular, hollow outer frame equally spaced around and coaxial with said inner frame;
    b. an upper and a lower annular row of wires respectively secured at one of their ends to the upper and lower ends of said inner frame and extending radially and convergently outwardly from said upper and lower ends to said outer frame and secured at their outer ends under tension to said outer frame;
    c. inflated bags of lighter-than-air gas between said upper and lower rows of wires;
    d. a cargo compartment at the lower end of said inner frame for holding cargo;
    e. impeller means carried by and outwardly of said outer frame for impelling said aircraft;
    f. an outer skin respectively above and below said upper and lower rows of wires secured to the upper and lower ends of said inner frame and extending convergently from said upper and lower ends to said outer frame and secured to the latter;
    g. said cargo compartment including a horizontal floor at the lower end of and supported by and rigid with said inner frame defining the bottom of space within the lower end portion of said inner frame for supporting cargo within said lower portion.

2. In an aircraft as defined in claim 1:
    h. means respectively at one of the ends of the wires of said upper and lower rows for adjusting the tension on said wires relative to each other.

3. In an aircraft as defined in claim 1:
    h. rigid means extending between said inner and outer frames and between upper and lower rows of wires, for taking the upward thrust of said bags of inflated air.

4. In an aircraft as defined in claim 3:
    i. said outer skin extending past said outer frame and terminating in a relatively sharp circular outer edge radially outwardly of the latter relative to said inner frame.

5. In an aircraft as defined in claim 4:
    j. a horizontal platform at the upper end of said inner hollow frame; and
    k. an elevator within said hollow frame extending from said platform to said cargo compartment for carrying cargo from said platform to said compartment, and vice versa.

6. In an aircraft as defined in claim 5:
l. said skin including a dome-like extension extending over said platform, and an upwardly directed opening therein for access to said platform from above; and
m. closure means supported on said extension for movement from a closed position closing said opening to an open position to a side of said opening and vice versa.

7. In an aircraft as defined in claim 3:
i. said outer frame being hollow and a plurality of bags inflated with lighter-than-air gas within said outer frame.

8. In an aircraft as defined in claim 7:
j. said inner frame and said outer frame being of skeleton-like construction of structural metal including posts, struts and annular rings; and
k. said impeller means being supported on said outer frame for variable movement about horizontal axes for impelling said aircraft upwardly and downwardly relative to a horizontal forward direction; and
l. elevator and rudder means respectively at the lateral edges and rear edges of said aircraft.

* * * * *